June 19, 1923.
F. A. LANE
TIRE CARRIER
Filed April 27, 1921
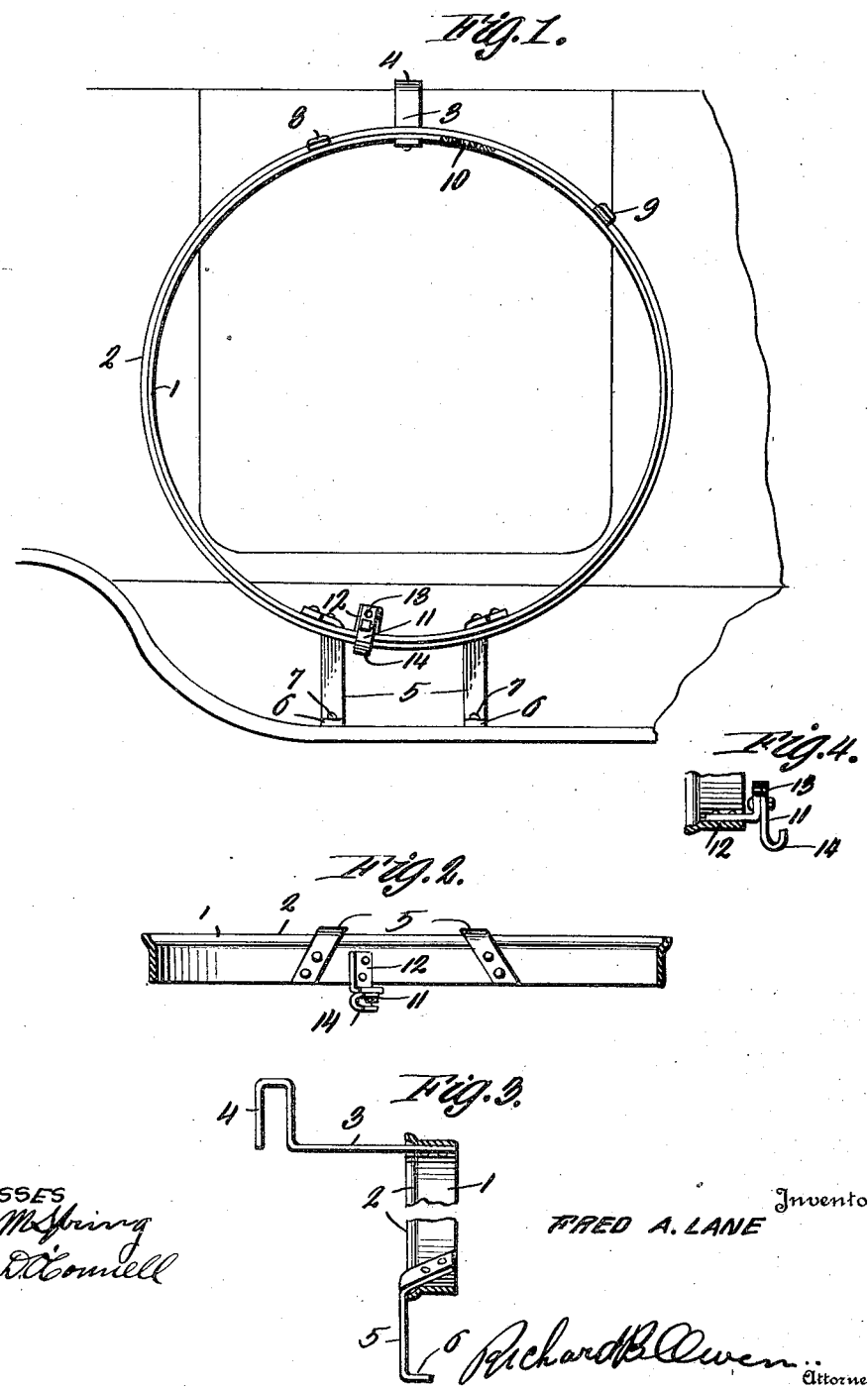

Patented June 19, 1923.

1,459,473

UNITED STATES PATENT OFFICE.

FRED A. LANE, OF SHELBURN, INDIANA.

TIRE CARRIER.

Application filed April 27, 1921. Serial No. 464,783.

*To all whom it may concern:*

Be it known that I, FRED A. LANE, citizen of the United States, residing at Shelburn, in the county of Sullivan and State of Indiana, have invented certain new and useful Improvements in Tire Carriers, of which the following is a specification.

The invention has reference to a device for carrying a spare tire on an automobile and provides a tire-carrying means in the nature of an attachment which can be very easily attached to or detached from an automobile body.

An additional object is to provide a tire-carrier of new and novel construction designed to firmly and securely support a spare tire and equipped with lock means readily releasable for removing the tire.

With the above and other objects in view the invention may be said to reside generally in the details of construction, combination and arrangement, as will be hereinafter more fully pointed out and described, reference being had to the accompanying drawings wherein:

Figure 1 shows a section of an automobile body with the carrier in place; Figure 2, a horizontal, transversed, sectional view of the carrier, looking towards the lower end; Figure 3, a detailed view illustrating the manner in which the carrier is equipped with attaching elements and Figure 4, a detailed view of the tire lock.

The attachment consists of an annular member or band 1 upon which the rim of the spare tire is adapted to be supported, the band being provided with an outwardly deflected annular flange 2 at the rear edge, against which flange the rim of the tire is adapted to bear. Fastened to the inner face of the band at one point is an attaching arm 3 having a hook-end 4 designed for engagement over the side of a car body. The lower end of the band carries a pair of supporting legs 5 riveted or otherwise fastened to the band, upon the inside, as illustrated in Fig. 3 and bent under at their lower terminals to provide a lip upon which the weight of the tire and carrier is supported. The legs of the device are adapted to rest upon the running board of the car with which the attachment is associated and is suitably apertured to receive a bolt or other fastener 7 inserted through the running board and lip, as may be seen in Figure 1. The supporting legs are properly positioned on opposite sides of the vertical center of the device in order that the latter may be properly balanced and the weight equally distributed upon the supporting elements. Higher retaining lugs 8 and 9 are provided on the band at suitable locations and on opposite sides of the valve hole 10, these lugs being inclined slightly upward from the band at their outer end in order to prevent the tire from slipping off of the carrier. The tire is locked on the carrier by means of a latch-lug 11 pivoted to swing from a bracket 12, the latter being bolted or otherwise fastened to the band on the inside and inwardly of supporting legs 5. Both the bracket and the latch-lugs are provided with an opening, above the pivot end, which openings are adapted to register when the finger engaging portion 13 of the lug is projected beyond the periphery of the band, thereby allowing a suitable lock device, such as a padlock, to be engaged with the two members for locking the tire and rim to the band.

In using the device the spare tire is supported on the carrier by inserting the rim thereon from the unflanged edge so that it encircles the band inwardly of the retaining lugs 8 and 9, it being understood, of course, that latch 11 has previously been swung either to the right or left of the supporting bracket so as not to interfere with the insertion of the tire. Subsequent to the placing the latch is swung back to its original position in which it projects in front of the tire so as to prevent it from slipping off of the holder. The application of a pad-lock or other locking means to the latch device will serve to make the locking of the tire on the band positive, and thus prevent the stealing thereof. In order that the tire may fit snugly to the band the valve opening 10 is provided for receiving the tire valve mechanism. With the tire in place the attachment is easily mounted upon a car by hooking the end of arm 3 which extends to the body of the car, over the top of the side as illustrated in Figure 1, while the lower portion may be bolted to the running board as previously explained. It will thus be seen that the attachment is of a removable character in that the fastening means can be readily manipulated for either applying or removing the device.

The foregoing description and accompanying drawings have reference to what might be considered to be the approved or preferred form of my invention. I desire it to be understood, however, that I may make such changes in the consideration, combination and arrangement of parts, materials dimensions, et cetera, as may prove expedient and fall within the scope of the appended claim.

Having thus described my invention, what I claim as new and desire to secure by Letters Patent is:—

A device for carrying spare rims and tires on the running board of an autotmobile comprising an annular flat supporting band, means associated with the band for detachably holding a tire and rim thereon, a pair of depending supporting legs disposed on opposite sides of the vertical diametric center of the band and having right angularly extending diverging band engaging feet on their upper ends and right angularly extending attaching feet on their lower ends for engaging the running board of the automobile, an inwardly extending supporting arm carried by the upper end of the band disposed intermediate the supporting legs and arranged at the direct vertical diametric center of the band, and a hook formed on the arm for engaging over the upper edge of the body of the automobile.

In testimony whereof I affix my signature in presence of two witnesses.

FRED A. LANE.

Witnesses:
  H. V. STARK,
  H. F. GOAD.